US008229776B1

(12) United States Patent
Woodward et al.

(10) Patent No.: US 8,229,776 B1
(45) Date of Patent: Jul. 24, 2012

(54) EVALUATION OF SUBSYSTEM TECHNOLOGY IN A SYSTEM-OF-SUBSYSTEMS ENVIRONMENT

(75) Inventors: David C. Woodward, North East, MD (US); Sara E. Wallace, Dahlgren, VA (US); Michael Robinson, Cherry Hill, NJ (US); Chris J. Dafis, Bala Cynwyd, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 331 days.

(21) Appl. No.: 12/454,036

(22) Filed: May 4, 2009

Related U.S. Application Data

(60) Provisional application No. 61/127,331, filed on May 6, 2008.

(51) Int. Cl.
*G06Q 10/00* (2012.01)
*G06F 17/50* (2006.01)
*G06F 7/60* (2006.01)
*G06G 7/48* (2006.01)

(52) U.S. Cl. ............... 705/7.11; 703/1; 703/2; 703/6; 705/7.14

(58) Field of Classification Search ............ 705/7.11; 703/1, 2, 6
See application file for complete search history.

(56) References Cited

U.S. PATENT DOCUMENTS

| | | | | |
|---|---|---|---|---|
| 6,922,599 B2 * | 7/2005 | Richey | | 700/98 |
| 7,636,650 B2 * | 12/2009 | Khalil | | 703/1 |
| 7,752,144 B1 * | 7/2010 | Myers et al. | | 705/400 |
| 2002/0120490 A1 * | 8/2002 | Gajewski et al. | | 705/10 |
| 2007/0288208 A1 * | 12/2007 | Grigsby et al. | | 703/2 |
| 2008/0313110 A1 * | 12/2008 | Kreamer et al. | | 706/12 |
| 2009/0144039 A1 * | 6/2009 | Thorsteinsson | | 703/6 |
| 2009/0276193 A1 * | 11/2009 | Momose et al. | | 703/1 |

* cited by examiner

*Primary Examiner* — Ryan Zeender
*Assistant Examiner* — Ariel Yu
(74) *Attorney, Agent, or Firm* — Howard Kaiser (57) ABSTRACT

The present invention represents a unique methodology for evaluating subsystem technology in a system-of-subsystems environment. According to typical inventive practice, the technology to be evaluated and the requirements for effecting the technology are defined, the requirements relating to both a subsystem encompassing the technology and a system overarching the subsystem. The technology and the requirements are modeled, the modeling including establishing plural submodels of the subsystem wherein the submodels are considered as characterized by plural linkages between them and as constituting a model of the overarching system. Sensitivity analysis and trade space exploration are performed, the performance including determination of plural design variables of the submodels, plural relationships between the design variables, and respective sensitivities of response variables to the design variables. Optimal designs of the technology are found, the finding including comparing relative optimizations of the optimal designs. Some inventive embodiments are iterative in furtherance of design optimization.

10 Claims, 9 Drawing Sheets

SEAQUEST

| DOE SETUP | | |
|---|---|---|
| Name of Design Variable | Lower Bound | Upper Bound |
| Weight | 1.5 | 2.5 |
| Speed Ratio | 0.25 | 0.45 |

| Name of Response Variable |
|---|
| Return on Investment (ROI) |
| Cost - $M |

FIG. 7

| Design Matrix | | | | | | | | | |
|---|---|---|---|---|---|---|---|---|---|
| | Design 1 | Design 2 | Design 3 | Design 4 | Design 5 | Design 6 | Design 7 | Design 8 | Design 9 |
| Weight - MT | 1.5 | 2 | 2.5 | 1.5 | 2 | 2.5 | 1.5 | 2 | 2.5 |
| Speed Ratio | 0.25 | 0.25 | 0.25 | 0.35 | 0.35 | 0.35 | 0.45 | 0.45 | 0.45 |
| ROI | 10yr | 20yr | 10yr | 15yr | 20yr | 10yr | 15yr | 15yr | 15yr |
| Cost - $M | $5 | $10 | $5 | $7.50 | $10 | $5 | $7.50 | $7.50 | $5 |

SIZE: Mn-0.5 Max-0.5
ORIENTATION: Mn-0.5 Max-0.5

FIG. 10

| Definition of the Objective | | |
|---|---|---|
| Name of Top-Level System Design Objective (An output of one of the sub-system models) | Value of Design Objective | Goal (Minimize or Maximize) |

FIG. 11

| Constraints | | |
|---|---|---|
| Name of Constraint 1 (An output of one of the sub-system models) | Lower Bound of Constraint 1 (if any) | Upper Bound of Constraint 1 (if any) |
| Name of Constraint 2 (An output of one of the sub-system models) | Lower Bound of Constraint 2 (if any) | Upper Bound of Constraint 2 (if any) |
| Name of Constraint 3 (An output of one of the sub-system models) | Lower Bound of Constraint 3 (if any) | Upper Bound of Constraint 3 (if any) |

FIG. 12

| Design Variables | | | |
|---|---|---|---|
| Name of Design Variable 1 (An input of one of the sub-system models) | Start Value of Design Variable 1 | Lower Bound of Design Variable 1 | Upper Bound of Design Variable 1 |
| Name of Design Variable 2 (An input of one of the sub-system models) | Start Value of Design Variable 2 | Lower Bound of Design Variable 2 | Upper Bound of Design Variable 2 |
| Name of Design Variable 3 (An input of one of the sub-system models) | Start Value of Design Variable 3 | Lower Bound of Design Variable 3 | Upper Bound of Design Variable 3 |

FIG. 13

EVALUATION OF SUBSYSTEM TECHNOLOGY IN A SYSTEM-OF-SUBSYSTEMS ENVIRONMENT

CROSS-REFERENCE TO RELATED APPLICATIONS

This application claims the benefit of U.S. provisional patent application No. 61/127,331, hereby incorporated herein by reference, filing date 6 May 2008, invention title "Evaluation of Subsystem Technology in a System-of-Subsystems Environment," joint inventors David C. Woodward et al.

BACKGROUND OF THE INVENTION

The decision to fund the technical development of a concept component, subsystem, or system has typically been done with limited knowledge of its impact on the platform on which it will eventually reside. The constraints and requirements of most early stage concept designs typically focus on operational performance of components. Only after a design is functionally engineered do cost, risk, and system applicability become determining factors in its evaluation. Unfortunately, this approach can divert valuable resources in the technical design of the component, when it is later "discovered" that the performance of the component within the system will be too costly or risky to implement in a system-level environment (system of systems), such as on a naval platform.

SUMMARY OF THE INVENTION

In view of the foregoing, an object of the present invention is to provide a method for evaluating subsystem technology in a system-of-subsystems environment. Further objects of the present invention are to provide a computer-inclusive system for performing same, and to provide a computer program product for performing same.

As typically embodied, the present invention's method for evaluating subsystem technology in a system-of-subsystems environment comprises: (a) defining the technology to be evaluated and the requirements for effecting the technology; (b) modeling the technology and the requirements; (c) performing sensitivity analysis and trade space exploration; and, (d) finding plural optimal designs of the technology. The requirements for effecting the technology relate to both a subsystem encompassing the technology and a system overarching the subsystem. The defining of the technology and the requirements includes formulating at least one one-line diagram illustrative of the technology and the requirements. The modeling of the technology and the requirements includes establishing plural submodels of the subsystem. The submodels are considered as characterized by plural linkages between them and as constituting a model of the overarching system. According to some inventive embodiments, the establishing of the submodels includes formulating at least one integrative diagram illustrative of the submodels and the model. The performing of the sensitivity analysis and the trade space exploration includes determining plural design variables of the submodels, plural relationships between the design variables, and respective sensitivities of response variables to the design variables. The determining of the design variables, the relationships, and the sensitivities include defining upper and lower bounds of the design variables and formulating at least one design matrix diagram illustrative of the design variables and the response variables. According to some inventive embodiments, the performing of the sensitivity analysis and the trade space exploration includes constructing at least one design of experiments. The finding of the optimal designs includes formulating at least one design-comparative diagram illustrative of relative optimizations of the optimal designs.

Traditional early concept designs focus on operational performance of components, and use cost and risk as decision factors only after the technical design has been fully evaluated; this conventional approach tends to waste valuable resources in the technical design of the subsystem, as it may be discovered after a sizable investment in resources that implementation of a component within a system will be too costly or too risky in a system-level environment (system of systems). The present invention, as typically embodied, incorporates performance, cost and risk of integration into the early stage design process.

As typically embodied, the present invention is a system design synthesis methodology for development of a trade space to generate a family of designs. Among the unique features of the present invention are the present invention's application of a systems engineering process definition and the present invention's combination thereof with design synthesis and analysis models, such as exemplified by inventive practice associated with ship machinery.

In applications involving shipboard technologies, the inventive methodology can provide the program manager a variety of design options, with the awareness early on of potential risks associated with each design and the ability to view the effects of changes in design variables on the overall ship design. The inventive incorporation of performance, cost and risk of integration into the top-level system design, early in the process, affords the program manager diverse design options and an awareness early on of potential risks associated with each design. Affording the program manager the ability to view the effects of change in design variables, based on changes in top-level system design requirements, can be extremely valuable. The present invention can make this information available to the program manager prior to the funding of an incompatible technical design.

The present inventors are U.S. Navy employees working for the Naval Surface Warfare Center. The inventive methodology represents a new process and a new tool. The inventive process is a systems engineering process. The inventive tool is a design synthesis tool. The present inventors have dubbed their methodology "SEAQUEST." Systems Engineering Approach ("SEA") is the present invention's systems engineering process; QUick Evaluation of Shipboard Technologies ("QUEST") is the present invention's design synthesis tool. The present invention thus has a "SEA" component and a "QUEST" component.

As typically embodied, the "SEA" component of the present invention's SEAQUEST methodology performs quantitative evaluations of subsystem technology insertions. The inventive SEA typically performs, inter alia, optimization and trade-space analysis of proposed sub-systems in a "system of systems" (or, as used synonymously herein, a "system of subsystems").

Most current naval system design and analysis methods use a bottom-up approach to analyze and optimize specific components for shipboard use. The inventive SEA process takes a systems engineering approach, analyzing the problem from the top, down. The present invention's SEA offers flexibility of design and ease of evaluation of technology insertions needed for iterative design. The ship system designer who practices the present invention is enabled to assess the ship-level impact of combinations of components, rather than to merely piece together a combination of individually optimized components. The assessment process of the inventive SEA provides several levels of comparison so as to filter the less attractive options prior to investing effort in more detailed analyses.

The typical main objective of solving a problem with the inventive SEA process is to find a family of designs which satisfy threshold requirements and are optimized toward goal requirements. In order to achieve this objective, the inventive SEA, as typically embodied, passes through four essential process stages: Scoping the Problem; Modeling; Sensitivity Analysis and Trade Space Exploration; Optimization.

The inventive QUEST, as typically embodied, includes a collection of models, written on commercial software, that allow a rapid calculation of component attributes. Independent capabilities of assessing particular characteristics, in order to address specific needs, have been growing within NAVSEA Philadelphia for several years; however, these types of individual capabilities were never brought together effectively in a cohesive fashion. The present invention's SEA process succeeds in doing so, integrating individual models into a cohesive toolset of models that interact with one another.

The inventive SEA and the inventive QUEST are independently useful; nevertheless, together SEA (process) and QUEST (tool) combine in a design synthesis methodology, namely, the inventive SEAQUEST. The present invention's SEAQUEST, a systems-engineering-process-driven tool, has the capability of performing detailed trade analysis in a multi-objective environment.

Incorporated herein by reference is each of the following papers and presentations disclosing various aspects of the present invention: Kimberly J. Drake, Michael Robinson, Patrick J. Violante, Sara E. Wallace and David C. Woodward, "Intelligent Tools Used in the Design of Navy Ships," *Naval Engineers Journal*, 2008, Volume 120, Number 1, American Society of Naval Engineers (ASNE) Intelligent Ships Symposium VII, 9-10 May 2007, Drexel University, Philadelphia, Pa. (This eight-page paper, presented on 10 May 2007, is also contained as Appendix A in U.S. provisional patent application No. 61/127,331); Kimberly J. Drake, Michael Robinson, Patrick J. Violante, Sara E. Wallace and David C. Woodward, "Intelligent Tools Used in the Design of Navy Ships," American Society of Naval Engineers (ASNE) Intelligent Ships Symposium VII, 9-10 May 2007, Drexel University, Philadelphia, Pa. (This twenty-page slide presentation, presented on 10 May 2007, is also contained as Appendix B in U.S. provisional patent application No. 61/127,331); David C. Woodward, Michael Robinson, Chris J. Dafis and Thomas W. Martin, "Early Stage Evaluation of Shipboard Systems Using SEAQUEST," Maritime and System Technology (MAST) 2007 Conference, 14-16 Nov. 2007, Genoa, Italy (This seven-page paper, presented on 14 Nov. 2007 in Session 2C Platforms—Propulsion and Power, is also contained as Appendix C in U.S. provisional patent application No. 61/127,331); Brian J. Brady, Chris J. Dafis, Sean M. Gallagher, Michael C. Robinson, David C. Woodward, "Early Stage Evaluation of Navy Ship Machinery Systems Using SeaQuest," Collaborative Systems Engineering and Design Symposium, Georgia Institute of Technology, 29 Apr.-1 May 2008 (twenty-page slide presentation, presented on 29 Apr. 2008).

BRIEF DESCRIPTION OF THE DRAWINGS

The present invention will now be described, by way of example, with reference to the accompanying drawings, wherein.

DESCRIPTION OF EXEMPLARY EMBODIMENTS OF THE INVENTION

Figure 1:
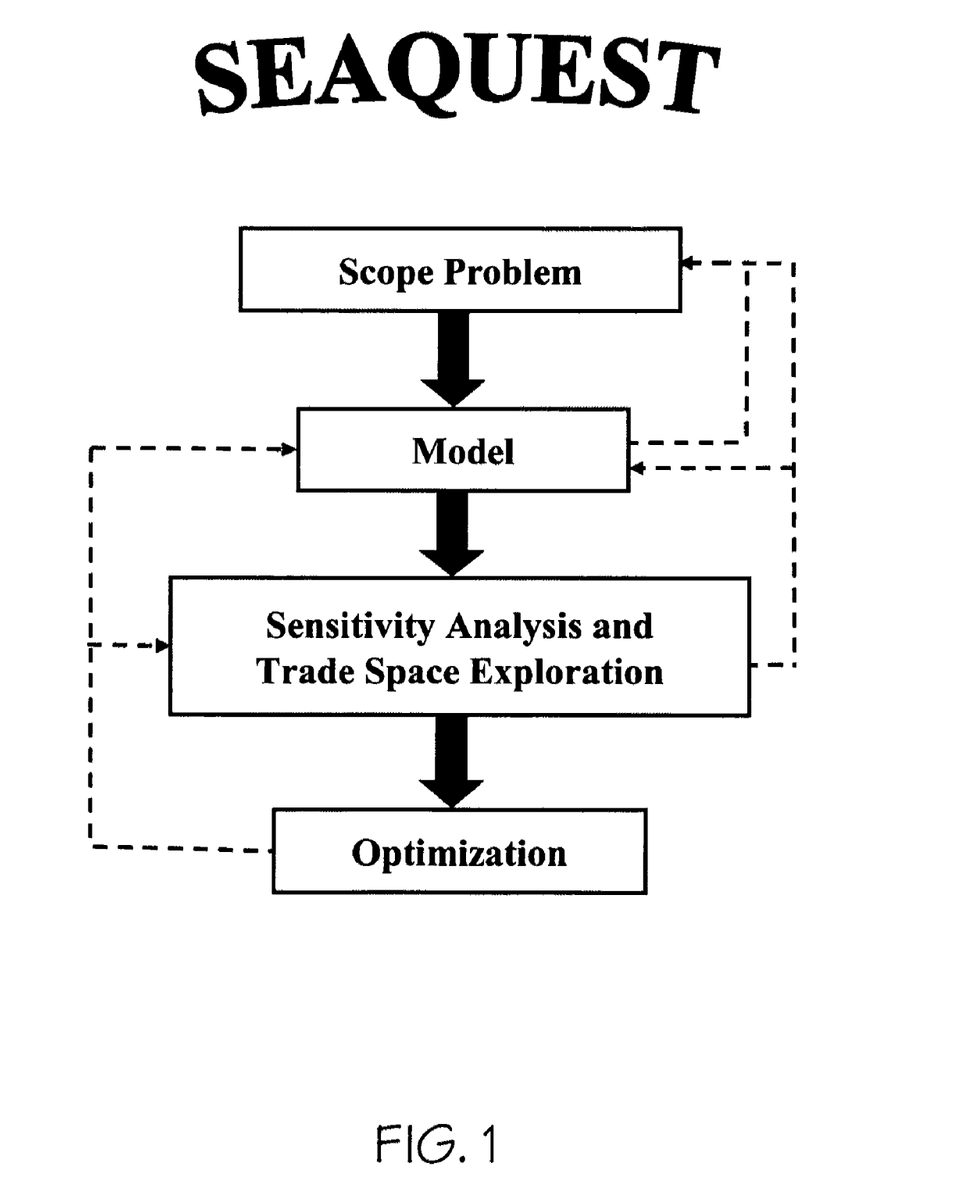
FIG. 1 is a schematic of typical practice in accordance with the present invention.
Figure 2:
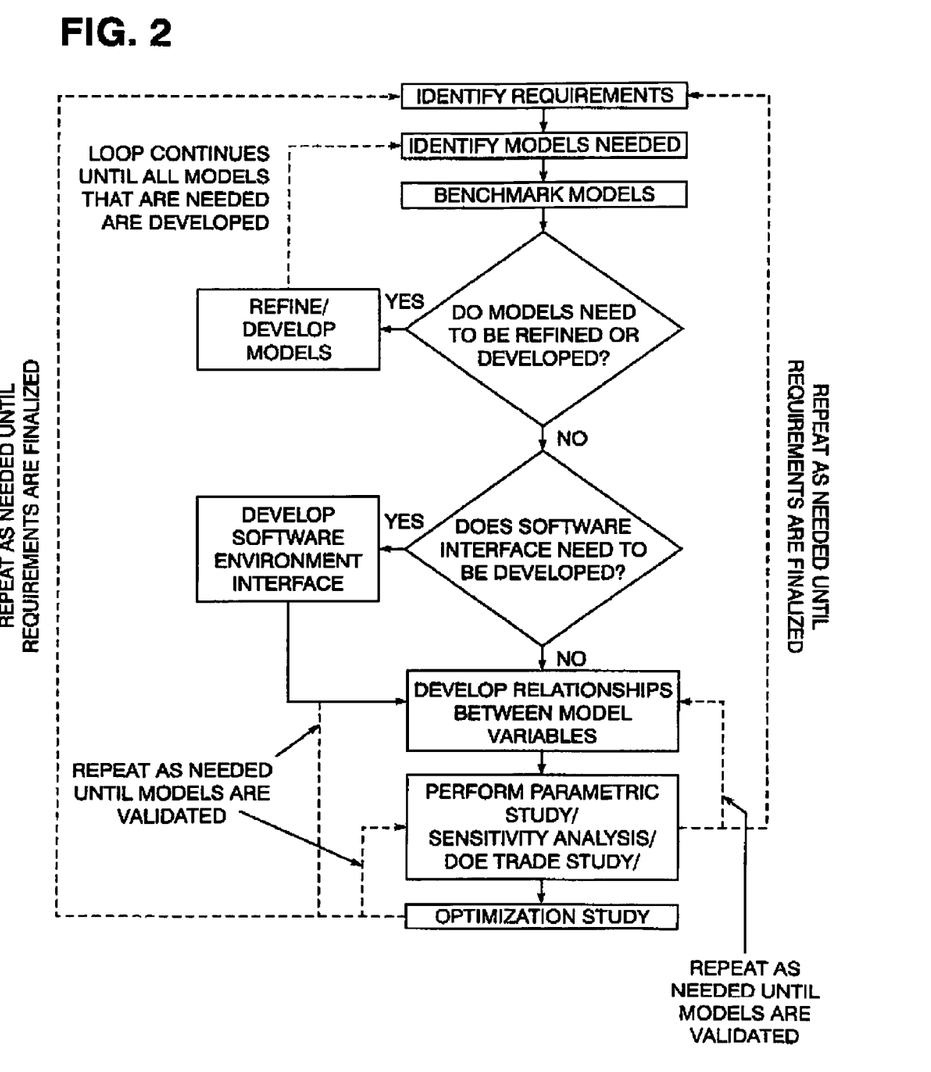
FIG. 2 is a schematic, corresponding to and more detailed than FIG. 1, of typical practice in accordance with the present invention.

Reference is now made to FIG. 1 and FIG. 2, which are schematics of typical embodiments of the present invention. FIG. 2 is essentially a more detailed version of FIG. 1, which illustrates the four stages of the inventive SEA process. For a given project, the inventive SEAQUEST typically follows the inventive SEA process of (i) Scoping the Problem, (ii) Modeling, (iii) Sensitivity Analysis and Trade Space Exploration, and (iv) Optimization. The inventive QUEST toolset is applied in each of these stages. As shown in FIG. 1, the second, third, and fourth stages may each require a return to a previous stage, for refinement purposes. The inventive synergy of SEA and QUEST is explained hereinbelow by considering, in turn, the four principal elements of the inventive SEA process.

Scoping the Problem

"Scoping the Problem" involves identifying system requirements and identifying constraints on the problem. Identifying requirements involves identifying such elements as key performance parameters, threshold and goal requirements, and metrics for evaluating performance parameters. Identifying constraints entails such things as finding boundaries on the performance parameters and identifying budget and scheduling constraints. The output of the Scoping stage includes the definition of a model architecture. This model architecture serves as a roadmap when building the actual model, as well as when finding data with which to populate the model for use in simulations.

The inventive SEAQUEST process was recently tested in application to an Alternative Propulsion (AP) study directed by the Chief of Naval Operations (CNO). This CNO AP study explored the possibilities of using various propulsion and ship service power plant configurations as well as different medium voltage electrical distribution configurations. For this AP study, the inventive "Scoping the Problem" involved first characterizing the system with a propulsion architecture using a one-line diagram, such as shown in FIG. 3.

Figure 3:
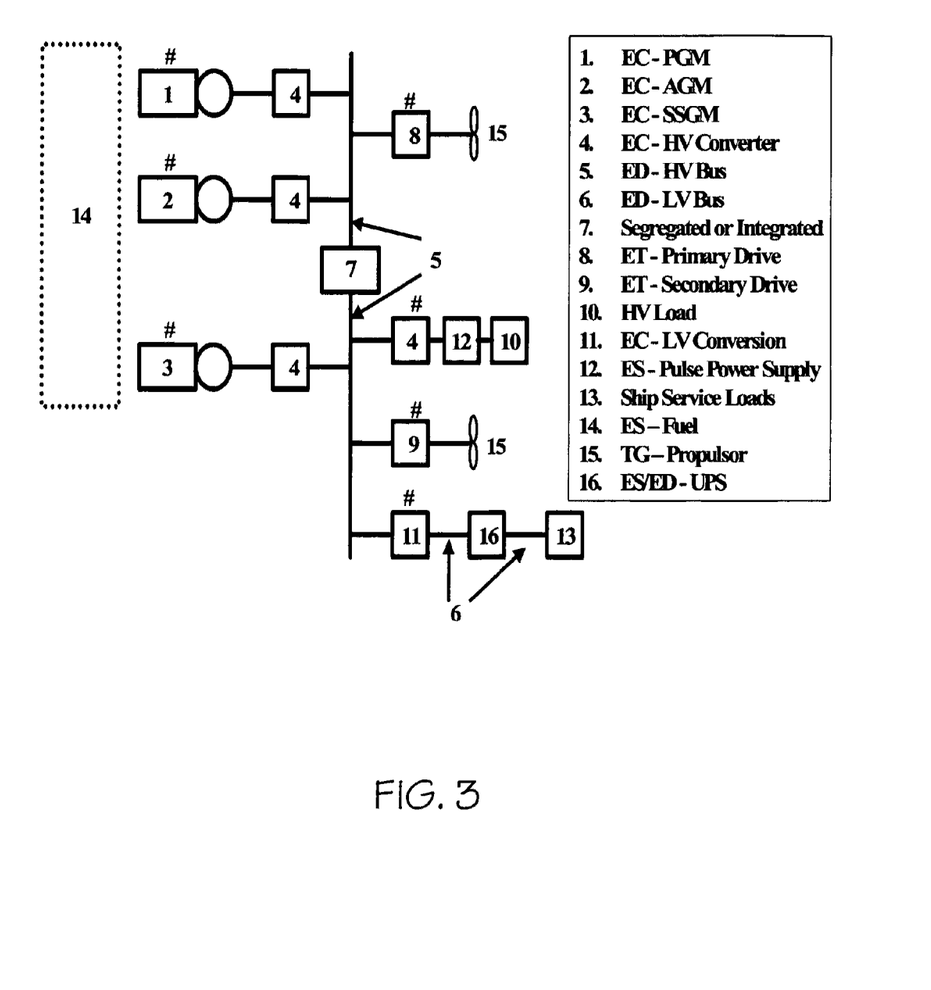
FIG. 3 is an example of a one-line diagram in accordance with the present invention.

FIG. 3 shows an example of a one-line diagram associated with this AP study. The one-line diagram shown in FIG. 3 is a representation of the propulsion system that includes the components necessary for definition of the system. This one-line diagramming phase of the present invention permits the determination of the resolution of detail needed to examine the tradeoff of one technology compared to another. By adding, subtracting or choosing components, mechanical, electrical or hybrid architectures are represented. Additional information is required, including but not limited to: power requirements; weight limitations; risk considerations; cost considerations; schedule considerations.

FIG. 2 illustrates the process stages for typical embodiments of the present invention. As indicated in FIG. 2, the present invention's "Scoping the Problem" is synonymously referred to herein as "Identifying the Requirements." FIG. 2 is a more detailed schematic, corresponding to the less detailed schematic shown in FIG. 1, of typical embodiments of the present invention's methodology. In accordance with inventive scoping of the problem (identification of the requirements), the inventive practitioner defines his/her overarching system. This inventive defining includes determining the technology of interest, which is what kind of technology will be evaluated as part of his/her task.

Still referring to FIG. 2, the "requirements" are those attributes or characteristics of a system that are considered critical or essential to the development of an effective capability (e.g., military capability), and those attributes or characteristics that make a significant contribution to the key attributes or characteristics of the system. These requirements can be attributes/characteristics of the technology of interest, or can relate to a larger system that has the technology of interest as one of its subsystems. This larger system is referred to herein as the "overarching system."

According to typical inventive practice, there are requirements for both the technology of interest and the overarching system. Often the inventive practitioner is provided these requirements as inputs to a task that he/she will perform using the inventive methodology. Sometimes the inventive practitioner will have a role in developing or further deriving the requirements. Of further note, results from studies (the last two blocks in FIG. 2) are shown in FIG. 2 to feed back to "Scoping the Problem," and can affect the requirements/inputs by causing modification of, addition to, or removal from existing requirements/inputs.

Modeling

The Modeling stage of the inventive SEA process involves gathering existing models or building new ones, as well as gathering data needed to simulate the system at later stages of the work. In the CNO Alternative Propulsion study, several existing QUEST component models were available to address several key attributes needed for analysis. Therefore, SEAQUEST leveraged the collection of existing QUEST component models and also developed several other models to fully address the CNO AP study requirements.

The modeling environment used in the present invention's SEAQUEST, as typically practiced, provides a way to link the component models written in common commercial software programs such as MATLAB, MS Excel, and VB Script. Through SEAQUEST, individual component models interact to optimize ship-level requirements, rather than optimize stove-piped, component-level requirements.

The second part of the present invention's "Modeling" stage, as the present invention is typically practiced, involves finding the data with which to populate the model for use in simulation. This part of the Modeling process is often far more challenging than it might seem. Sometimes the data required by the model does not exist, and the model must be modified so that the data is no longer necessary. Sometimes it is sufficient to find a good approximation of the required data; however, the approximation must be sufficient so as to not compromise the fidelity of the model. At the end of the inventive Modeling stage, a fully populated, executable model of the system will exist.

For the CNO Alternative Propulsion study, the Modeling phase included gathering existing model data of motors, generators, etc. The inventive Modeling also included finding the data to populate these models with different types and sizes of these components and for the canvassing of industry with a Technology Survey via a Federal Business Announcement. In accordance with the "Identify Models Needed" box shown in FIG. 2, the inventive practitioner identifies the models that he/she will need to analyze the "technology of interest," and possibly the "overarching system" of which the "technology of interest" is a subsystem), in terms of the "requirements" that have been identified in the previous stage/step (first box as shown in FIG. 2). The inventive practitioner determines the type(s) of engineering analysis needed to study effects on requirements. Examples of types of analysis include: cost of machinery development; cost of machinery maintenance; reliability of a piece of machinery; energy consumption for a ship; etc. The inventive practitioner determines the supporting information needed to perform these engineering analyses.

Figure 4:
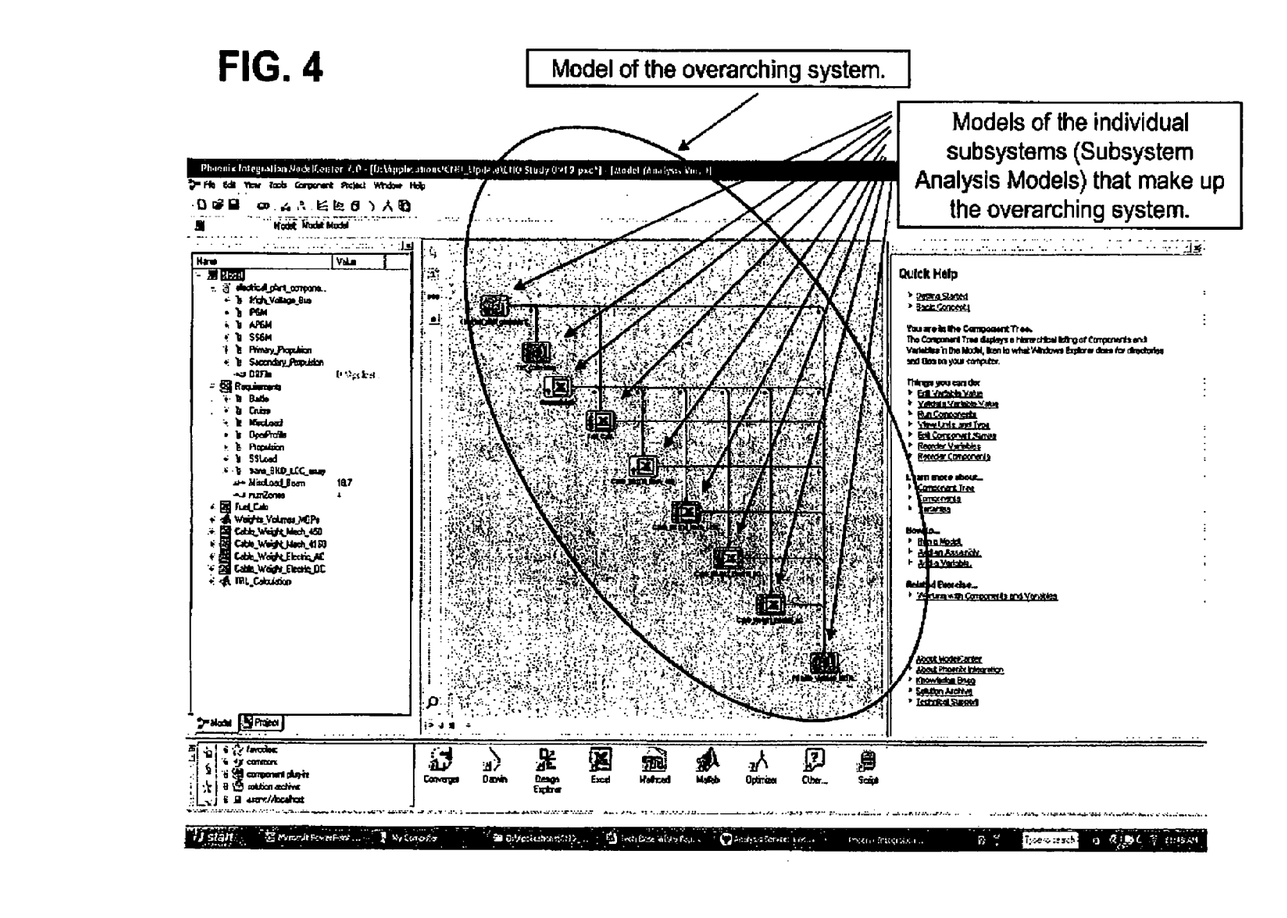
FIG. 4 is an example, in accordance with the present invention, of a computer screenshot of several subsystem models as constituting an overarching system model.

With reference to FIG. 4, each model that is identified can be considered a Subsystem Analysis Model. All of these Subsystem models together make up the model of the Overarching System. The relationships between/among the variables used in each Subsystem model are shown generically in FIG. 4 by single black arrows connecting the Subsystem models). As exemplified by FIG. 4, the present invention uniquely integrates machinery (e.g., ship machinery) life cycle cost models and technical integration risk models with system architecture design synthesis models. As depicted in FIG. 4, the present invention uniquely integrates a design reference (speed-state-time) mission profile with a lifetime fuel usage model.

Sensitivity Analysis and Trade Space Exploration

According to typical inventive practice, the "Sensitivity Analysis and Trade Space Exploration" stage starts with constructing a rough/coarse "Design of Experiments" (DOE). Typically, an inventive DOE is an approximation of the actual trade space, and the results of the DOE provide the opportunity to view relationships between model variables. The results of the rough/coarse DOE can be used to determine the sensitivity of the objectives, such as cost and risk, to the design variables.

Figure 5:
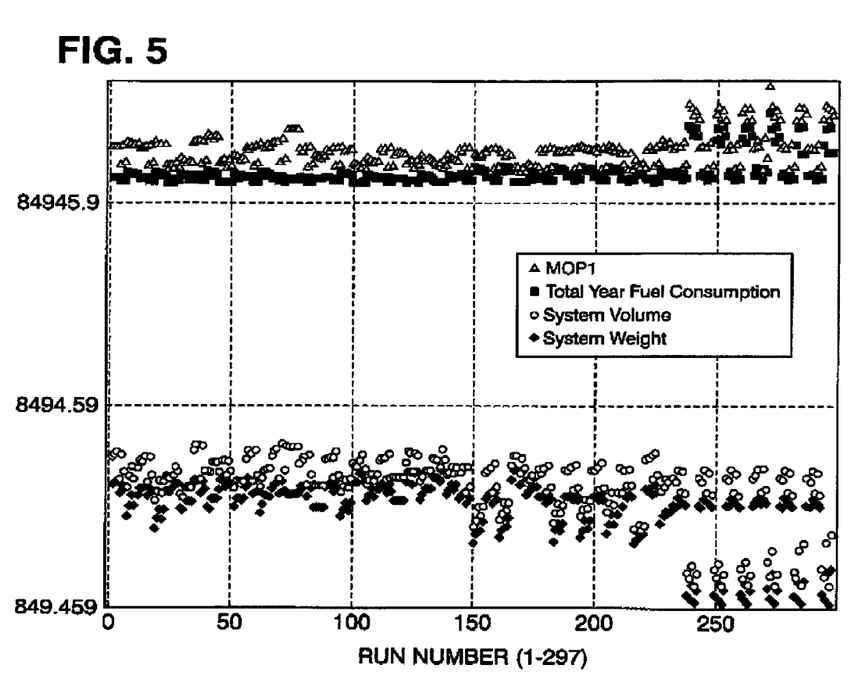
FIG. 5 is an example, in accordance with the present invention, of a computer-generated graph showing data based on three measures of performance (MOPs), viz., total annual fuel consumption, total system volume, and total system weight.

SEAQUEST tools not only permit the construction of design-of-experiments, but can also be used to visualize the results of the analysis. For instance, each design can represent a single point on a graph whose axes are the system metrics being optimized. The results from one part of the CNO Alternative Propulsion study are shown by way of example in FIG. 5. Using the data from the AP study, each design of interest was plotted using the visualization tools utilized by the inventive SEAQUEST. Presented in FIG. 5 is the part of the DOE examining total fuel consumption, system volume, and system weight.

Because the DOEs give a snapshot view of the trade space, they are of particular value in the Machinery System Trade Studies performed in accordance with the present invention. The value of DOEs in this example of inventive practice lies especially in limiting the computational resources and time that would be required to analyze the over one billion combinations of engines, engine numbers, drive trains, numbers of zones, and other variables typically used in such studies. DOEs allow a smaller subset to represent the whole trade space, thereby saving time and resources.

The present invention's Sensitivity Analysis and Trade Space Exploration stage typically results in identifying parameters of influence, points of interest, and bounds of investigation. Parameters of influence are those parameters such that small changes in the parameter result in large changes in the system outputs or objectives. Points of interest are those designs that have the potential to be optimal. The points of interest might be part of a Pareto Front, or area of the design where a key parameter seems especially sensitive. Finally, the rough/coarse DOE usually results in a refinement of the boundaries on the parameters.

Figure 6:
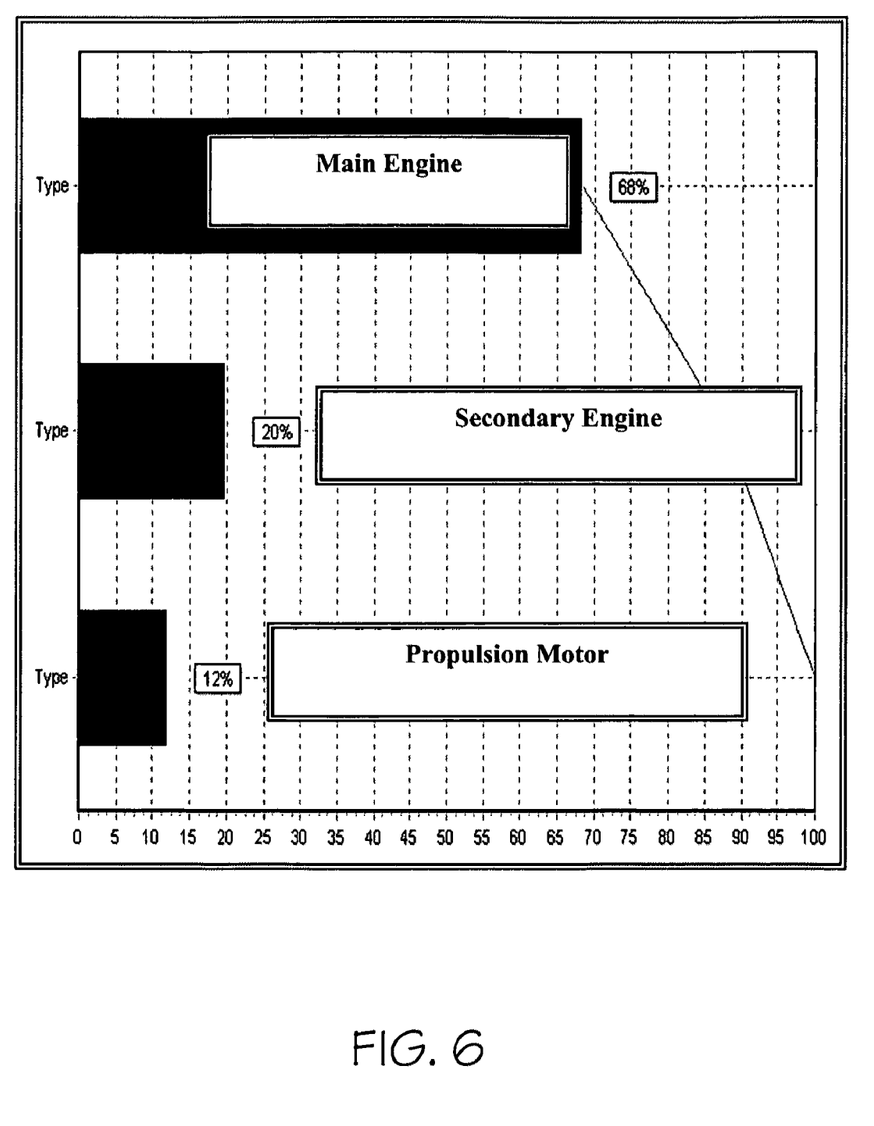
FIG. 6 is an example, in accordance with the present invention, of a computer-generated graph showing respective effects on energy consumption of three propulsive machinery components, viz., main engine machinery, secondary engine (e.g., energy conversion) machinery, and propulsion motor machinery.

FIG. 6 shows the results of a sensitivity analysis on energy consumption for the CNO Alternative Propulsion Study. This sensitivity analysis confirms what the design community typically speculates; that is, in ship designs, the selection of the Energy Conversion equipment has a larger influence on energy consumption than does the selection of the Propulsion Energy Consumer (the Propulsion Motor).

As illustrated in FIG. 1, it is possible that, during the present invention's Sensitivity Analysis and Trade Space Exploration stage, one or more returns to the initial two inventive stages may be required. If the constraints on the trade space are inadequately defined, it might be necessary to return to the Scoping stage to more clearly define the problem. It is also possible that the rough/coarse DOE can uncover an unexpected result, which might cause reevaluation of requirements or metrics. If there are too few parameters of influence, or if insufficient modeling of key parameters becomes apparent, it might be necessary to return to the Modeling stage in order to further refine the model or find more refined data.

The present invention's Design of Experiments (DOE) is a tool in the ModelCenter™ (MC) environment utilized by the present invention in this example. The DOE Tool can be used to determine the effects of input variables on output variables, and to provide a better understanding of the overall design space. A DOE is set up within ModelCenter™ by choosing the "design variables" (inputs) and responses (outputs) to be studied.

By definition according to the present invention as typically practiced, a design variable can only be an input variable to one of the Subsystem analysis models that make up the overall model. Lower and upper bounds should be set in order to prevent physically unrealistic values and to restrict the design space. If all design variables are continuous and have upper and lower bounds specified, then the ModelCenter™ will automatically generate a design matrix containing full factorial design, such as shown in FIG. 8.

Figure 7:
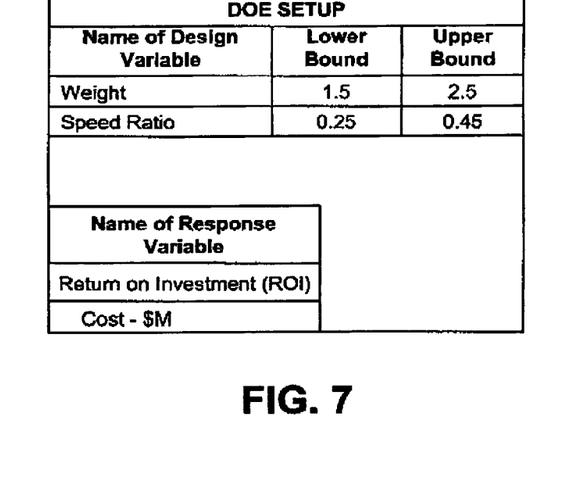
FIG. 7 is an example, in accordance with the present invention, of a computer-generated table defining upper and lower bounds for two parameters. In this example, the two parameters are weight and speed ratio of a machine such as a motor, a propulsor, or a transmission.
Figure 8:
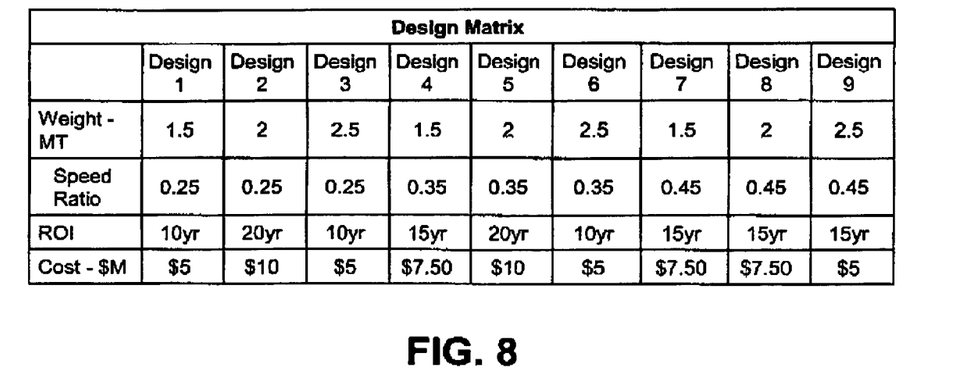
FIG. 8 is an example, in accordance with the present invention, of a computer-generated table referred to herein as a "design matrix." In this example, the design matrix is based on the two parameters shown in FIG. 7.

As an example, with reference to FIG. 7 and FIG. 8, let us assume that we want to determine the return on investment (ROI) and the cost of a machine for various values of the weight and the speed ratio of the machine. The ModelCenter™ allows us to specify upper and lower bounds for the weight and speed ratio, such as shown in FIG. 7. When the upper and lower bounds are set, then the DOE Tool in the Model Center will generate a Design Matrix based on these parameters, such as shown in FIG. 8

Optimization

In the final stage of application of the inventive SEA process, the inventive SEAQUEST is used to identify a family of optimal designs. On small problems, the optimization might be the result of a refined DOE where a small but detailed view of the design space is considered. It might also result from the more formal method of setting up and solving an optimization problem using optimization software based, for instance, on genetic algorithms or pattern search algorithms.

It is possible that a return to the Modeling stage and/or the Sensitivity Analysis stage might be necessary before the Optimization stage is complete. The optimization might require more refined data, better fidelity in the models, or finer resolution of the sub-models, than was originally expected. A return to the Sensitivity stage might be required to refine the boundaries of the optimization, or to reexamine the parameters of influence.

The flexibility of the inventive SEAQUEST modeling environment enables the user to vary individual parameters of the design to see how they affect the overall system. In this way, the inventive tool not only provides a roadmap for research and development efforts, but also predicts the risk impact associated with prototype equipment failing to meet all predicted design characteristics. Further, SEAQUEST facilitates cost-benefit evaluation of alternative technologies and technology insertions on existing, as well as future, platforms.

Figure 9:
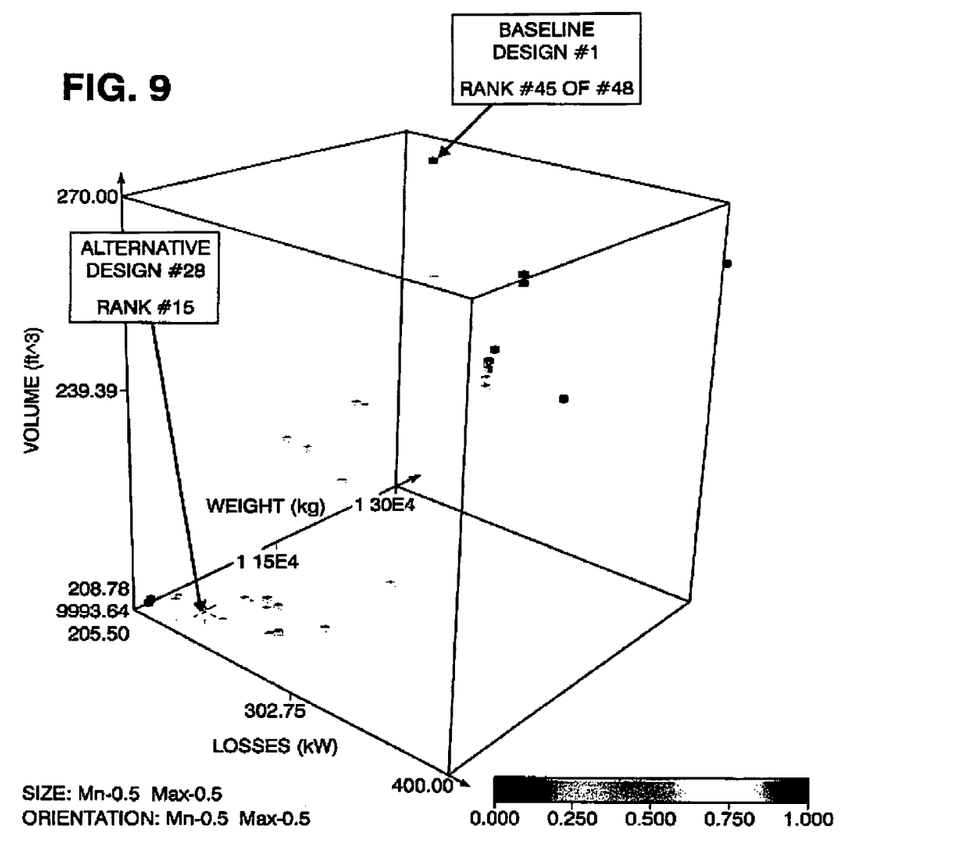
FIG. 9 is an example, in accordance with the present invention, of a computer-generated three-dimensional graph showing respective rankings of various ship component designs in terms of the abovementioned three (MOPs), viz., total annual fuel consumption, total system volume, and total system weight.

With reference to FIG. 9, the design analysis visualized illustrates that the baseline ship component design #1 ranked low (45th out of 48 designs) due to its high weight, efficiency, and volume objective variables; in contrast, the alternative design #28 ranked $15^{th}$, since the weight, efficiency, and volume were much lower. The results of this and similar studies can be used as a baseline to focus R&D and acquisition funding. Although FIG. 9 is a three-dimensional representation, it is to be understood that any plural number of dimensions of a diagrammatic (e.g., graphical) representation is possible in inventive practice.

While application of the present invention's SEAQUEST to the CNO Alternative Propulsion study demonstrates the importance of focus on electrical and propulsion architectures based primarily on fuel efficiency, SEAQUEST can be used to optimize designs for any program metric, such as cost, risk, performance, efficiency, size (weight, volume, and footprint), etc. Inventive use of the program's relevant mission effectiveness metrics can allow R&D and acquisition funding to be focused on the system designs and components that will optimize current and future ship systems.

Figure 10:
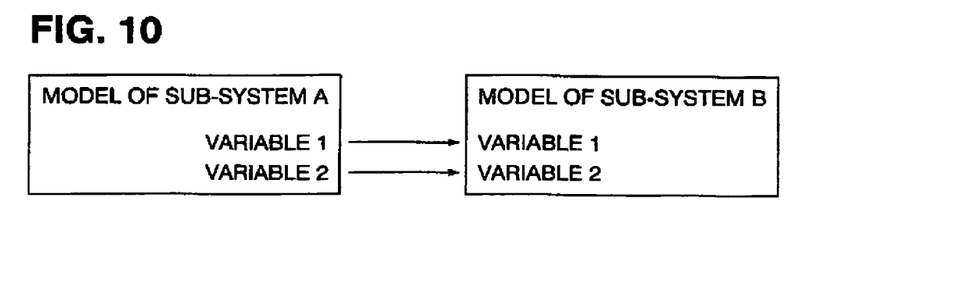
FIG. 10 is an example, in accordance with the present invention, of a diagram showing linkages between variables of different models.
Figure 11:
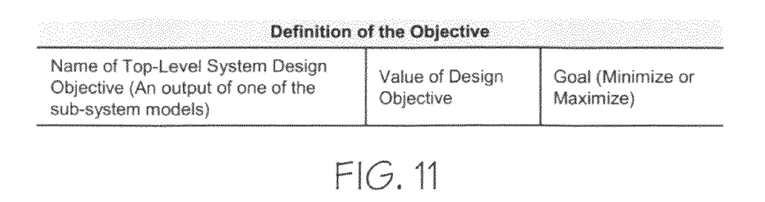
FIG. 11, FIG. 12, and FIG. 13 are examples, in accordance with the present invention, of tables showing objective, constraints, and variables, respectively.
Figure 12:
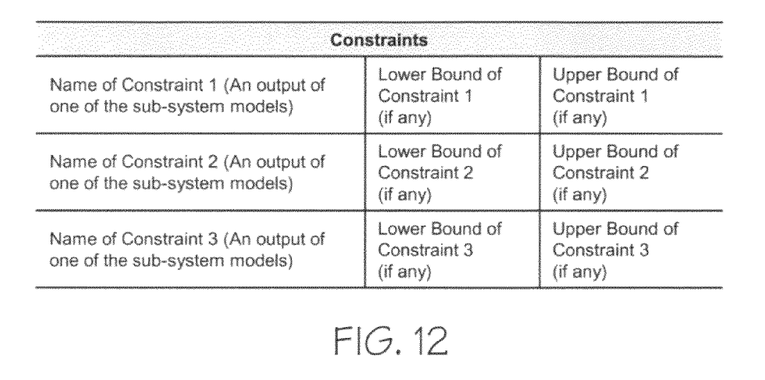
Figure 13:
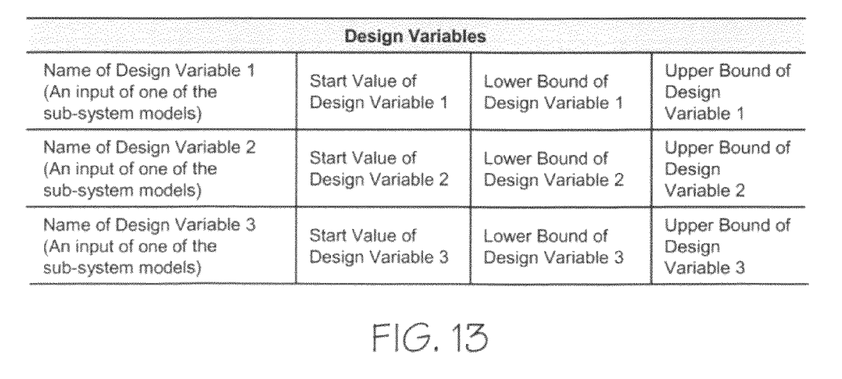

The present invention, a unique system design synthesis methodology, takes a systems engineering approach and performs a top-down analysis, rather than a traditional bottom-up analysis. As typically practiced, the present invention operates in a software environment that allows: variables from multiple models to be linked (such as shown in FIG. 10); parameters, individual or grouped, to be varied (such as shown in FIG. 11 through FIG. 13); and the specification of multiple objectives (such as shown in FIG. 11 through FIG. 13). According to typical inventive practice, the inventive practitioner finds a family of designs that satisfy threshold requirements and are optimized toward goal requirements.

DOEs (Designs of Experiments) can be constructed to determine the sensitivity of the objectives to the design variables. A DOE gives a snapshot of the trade-space. The output of the Scoping stage is the definition of a model architecture. This model architecture serves as a roadmap when building the actual model, as well as when finding data with which to populate the model for use in simulations.

The present invention, as typically embodied, is an iterative process. If there are too few parameters of influence, and/or if insufficient modeling of key parameters becomes apparent, the present invention provides for return to the modeling stage in order to further refine the model or find more refined data. It is possible, in inventive practice, that a return to the modeling stage and/or the sensitivity analysis stage be necessary, before the optimization stage is complete.

The present invention's individual models can be black boxes, and the present invention defines the relationships between/among the black boxes. Interactions between/among the integrated machinery components are captured, and the future system is optimized as a system of systems (toward top-level metrics). Development and implementation of additional relevant top-level system effectiveness metrics in the invention allows resources for top-level system development to be focused on the system designs and subsystems that will optimize top-level system metrics.

As typically embodied, the present invention: incorporates cost and risk analysis during the early S&T (Science and Technology) and R&D (Research and Development) phases of technology development; facilitates cost-benefit evaluation of alternative technologies; can be used to reduce cost and risk while improving overall performance; predicts risk impact; permits cost and risk to be considered as part of the early stages of technology development; permits evaluation of iterative or progressive technology insertions in existing top-level systems; identifies areas where R&D of subsystems can offer the best return on investment; evaluates the integrated performance of existing and new technology/technologies in future top-level systems; permits evaluation of the impact of system and subsystem level requirements on the design and development of the subsystem; permits evaluation of the impact of the subsystems on the top-level system-of-systems of which they are a part.

The inventive SEAQUEST affords capabilities to vary individual parameters of the design to determine how the variations affect the overall system. This leads, according to typical inventive practice, not only to roadmaps of research and development efforts, but also to predictions of risk impacts associated with prototype equipment(s) not meeting all predicted design characteristics. SEAQUEST provides the program manager the ability to examine, early and quickly, the viability of a new technology for his/her application.

The word "early," as used in the context of the preceding sentence, is a relative term, as, generally speaking, the inventive SEAQUEST lends itself to practice at any phase of a system design application. For instance, SEAQUEST can be used in any or all three phases of a ship's life. Firstly, SEAQUEST can be used to identify areas of research and development of machinery and machinery components that offer the best return of investment. Secondly, SEAQUEST can be used to evaluate the potential performance of existing and new technology in future ship systems. Thirdly, SEAQUEST can be used to evaluate the benefits of spiral technology insertions in existing ship systems.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications, and changes to the principles disclosed herein may be made by one skilled in the art without departing from the true scope and spirit of the present invention, which is indicated by the following claims.

What is claimed is:

1. A computer-implemented method for evaluating subsystem technology pertaining to energy consumption in a system-of-subsystems environment onboard a ship, the method comprising:

defining, using a computer, the technology to be evaluated and the requirements for effecting said technology, said requirements relating to both a subsystem encompassing said technology and a system overarching said subsystem, said defining of said technology and said requirements including formulating at least one one-line diagram, said at least one one-line diagram including representation of components of said overarching system so as to be illustrative of said technology and said requirements;

modeling, using a computer, said technology and said requirements, said modeling of said technology and said requirements including establishing plural submodels of said subsystem that are considered as characterized by plural linkages therebetween and as constituting an energy-consumption model of said overarching system, said submodels including a design reference mission submodel and a fuel usage submodel, said design reference mission submodel representing operating conditions of a ship in relation to operation of the ship, said operating conditions including speed, state, and time, said fuel usage submodel being characterized by a selected period of time and representing respective effects on energy consumption of propulsive machinery components including main engine machinery, secondary engine machinery, and propulsion motor machinery, said modeling of said technology and said requirements including formulating at least one integrative diagram illustrative of said design reference mission submodel and said fuel usage submodel;

performing, using a computer, sensitivity analysis and trade space exploration, said performing of said sensitivity analysis and said trade space exploration including determining plural design variables of said submodels, plural relationships between said design variables, and respective sensitivities of response variables to said design variables, said determining of said design variables, said relationships, and said sensitivities including defining upper and lower bounds of said design variables and formulating at least one design matrix diagram illustrative of said design variables and said response variables; and finding, using a computer, plural optimal designs of said technology, said finding of said optimal designs including formulating at least one design-comparative diagram, said at least one design-comparative diagram including comparison of said optimal designs so as to be illustrative of relative optimizations of said optimal designs;

wherein said submodels include a machinery life cycle cost submodel, a technical integration risk submodel, and a system architecture design synthesis submodel;

wherein said modeling of said technology and said requirements includes formulating at least one integrative diagram illustrative of said machinery life cycle cost submodel, said technical integration risk submodel, and said system architecture design synthesis submodel;

wherein said establishing of said submodels includes formulating at least one integrative diagram illustrative of said submodels and said model; and wherein said performing of said sensitivity analysis and said trade space exploration includes constructing at least one design of experiments.

2. The method of claim 1, wherein at least one said design-comparative diagram is a plural-dimensional said design-comparative diagram.

3. The method of claim 1, wherein the method is iterative, at least one of the steps of said defining of said technology and said requirements, said modeling of said technology and said requirements, said performing of said sensitivity analysis and said trade space exploration, and said finding of said optimal designs being repeated at least once.

4. The method of claim 1, wherein at least one said design-comparative diagram is a three-dimensional said design-comparative diagram.

5. A system comprising a computer configured to perform a method for evaluating subsystem technology pertaining to energy consumption in a system-of-subsystems environment onboard a ship, the method including:

defining the technology to be evaluated and the requirements for effecting said technology, said requirements relating to both a subsystem encompassing said technology and a system overarching said subsystem, said defining of said technology and said requirements including formulating at least one one-line diagram, said at least one-line diagram including representation of components of said overarching system so as to be illustrative of said technology and said requirements;

modeling said technology and said requirements, said modeling of said technology and said requirements including establishing plural submodels of said subsystem that are considered as characterized by plural linkages therebetween and as constituting an energy-consumption model of said overarching system, said submodels including a design reference mission submodel and a fuel usage submodel, said design reference mission submodel representing operating conditions of a ship in relation to operation of the ship, said operating conditions including speed, state, and time, said fuel usage submodel being characterized by a selected period of time and representing respective effects on energy consumption of propulsive machinery components including main engine machinery, secondary engine machinery, and propulsion motor machinery, said modeling of said technology and said requirements including formulating at least one integrative diagram illustrative of said design reference mission submodel and said fuel usage submodel;

performing sensitivity analysis and trade space exploration, said performing of said sensitivity analysis and said trade space exploration including determining plural design variables of said submodels, plural relationships between said design variables, and respective sensitivities of response variables to said design variables, said determining of said design variables, said relationships, and said sensitivities including defining upper and lower bounds of said design variables and formulating at least one design matrix diagram illustrative of said design variables and said response variables; and finding plural optimal designs of said technology, said finding of said optimal designs including formulating at least one design-comparative diagram, said at least one design-comparative diagram including comparison of said optimal designs so as to be illustrative of relative optimizations of said optimal designs;

wherein said submodels include a machinery life cycle cost submodel, a technical integration risk submodel, and a system architecture design synthesis submodel;

wherein said modeling of said technology and said requirements includes formulating at least one integrative diagram illustrative of said machinery life cycle cost submodel, said technical integration risk submodel, and said system architecture design synthesis submodel;

wherein said establishing of said submodels includes formulating at least one integrative diagram illustrative of said submodels and said model; and wherein said performing of said sensitivity analysis and said trade space exploration includes constructing at least one design of experiments.

6. The system of claim 5, wherein at least one said design-comparative diagram is a plural-dimensional said design-comparative diagram.

7. The system of claim 5, wherein said method is iterative, at least one of the steps of said defining of said technology and said requirements, said modeling of said technology and said requirements, said performing of said sensitivity analysis and said trade space exploration, and said finding of said optimal designs being repeated at least once.

8. A computer program product for evaluating subsystem technology pertaining to energy consumption in a system-of-subsystems environment onboard a ship, the computer program product comprising a computer-readable storage medium having computer-readable program code portions stored therein, the computer-readable program code portions including:

a first executable portion for defining the technology to be evaluated and the requirements for effecting said technology, said requirements relating to both a subsystem encompassing said technology and a system overarching said subsystem, said defining of said technology and said requirements including formulating at least one one-line diagram, said at least one-line diagram including representation of components of said overarching system so as to be illustrative of said technology and said requirements;

a second executable portion for modeling said technology and said requirements, said modeling of said technology and said requirements including establishing plural submodels of said subsystem that are considered as characterized by plural linkages therebetween and as constituting an energy-consumption model of said overarching system, said submodels including a design reference mission submodel and a fuel usage submodel, said design reference mission submodel representing operating conditions of a ship in relation to operation of the ship, said operating conditions including speed, state, and time, said fuel usage submodel being characterized by a selected period of time and representing respective effects on energy consumption of propulsive machinery components including main engine machinery, secondary engine machinery, and propulsion motor machinery, said modeling of said technology and said requirements including formulating at least one integrative diagram illustrative of said design reference mission submodel and said fuel usage submodel;

a third executable portion for performing sensitivity analysis and trade space exploration, said performing of said sensitivity analysis and said trade space exploration including determining plural design variables of said submodels, plural relationships between said design variables, and respective sensitivities of response variables to said design variables, said determining of said design variables, said relationships, and said sensitivities including defining upper and lower bounds of said design variables and formulating at least one design matrix diagram illustrative of said design variables and said response variables; and a fourth executable portion for finding plural optimal designs of said technology, said finding of said optimal designs including formulating at least one design-comparative diagram, said at least one design-comparative diagram including comparison of said optimal designs so as to be illustrative of relative optimizations of said optimal designs wherein said submodels include a machinery life cycle cost submodel, a technical integration risk submodel, and a system architecture design synthesis submodel;

wherein said modeling of said technology and said requirements includes formulating at least one integrative diagram illustrative of said machinery life cycle cost submodel, said technical integration risk submodel, and said system architecture design synthesis submodel;

wherein said establishing of said submodels includes formulating at least one integrative diagram illustrative of said submodels and said model; and wherein said performing of said sensitivity analysis and said trade space exploration includes constructing at least one design of experiments.

9. The computer program product of claim 8, wherein at least one said design-comparative diagram is a plural-dimensional said design-comparative diagram.

10. The computer program product of claim 8, wherein the computer-readable program code portions further include a fifth executable portion for affording repeatability to the corresponding functions of said first executable portion, said second executable portion, said third executable portion, and said fourth executable portion.

* * * * *